March 7, 1967 A. L. STUCHBERY 3,307,681
APPARATUS FOR PRESSING TRAVELLING CAN BODY SIDE SEAMS
Filed Nov. 30, 1964 2 Sheets-Sheet 1
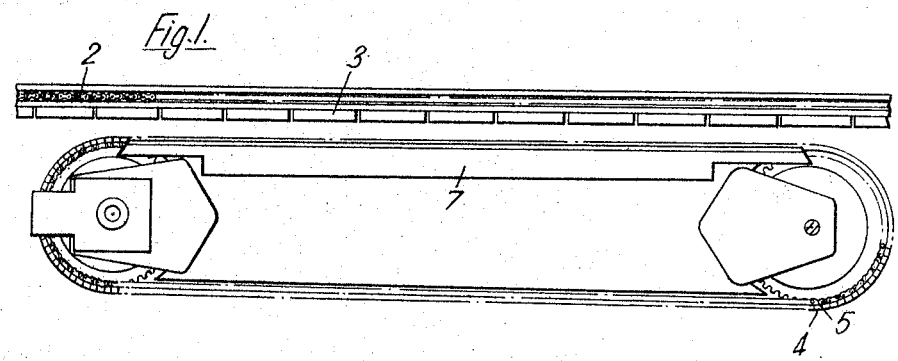
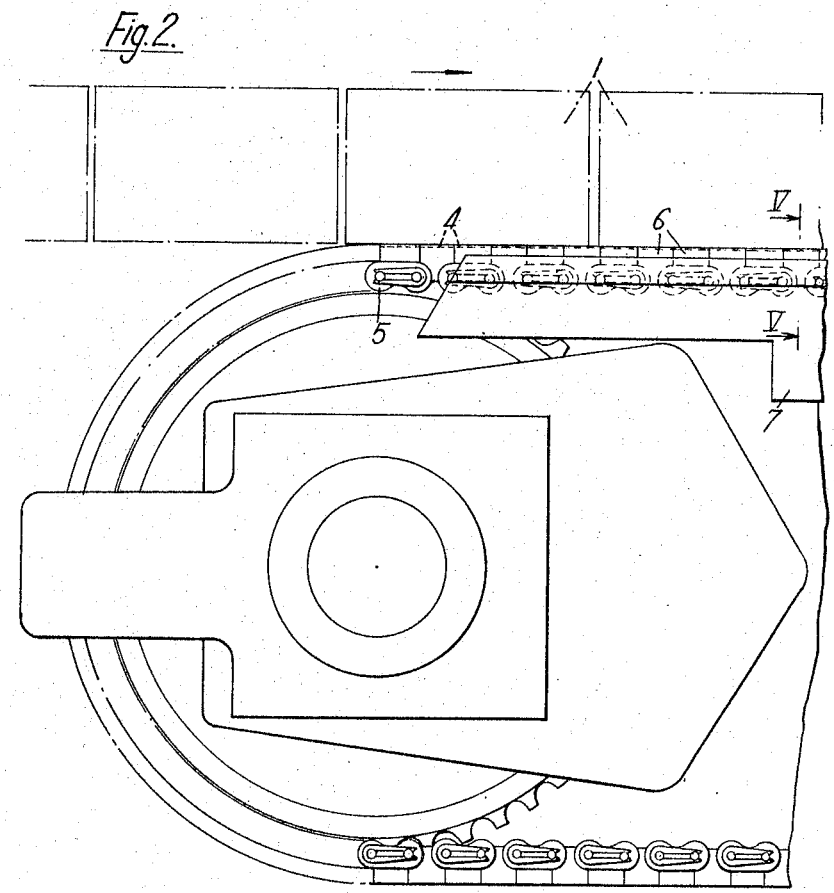
Inventor
Arthur Leslie Stuchbery.

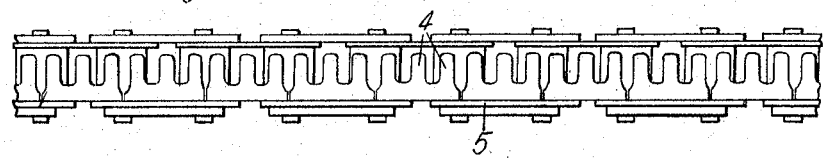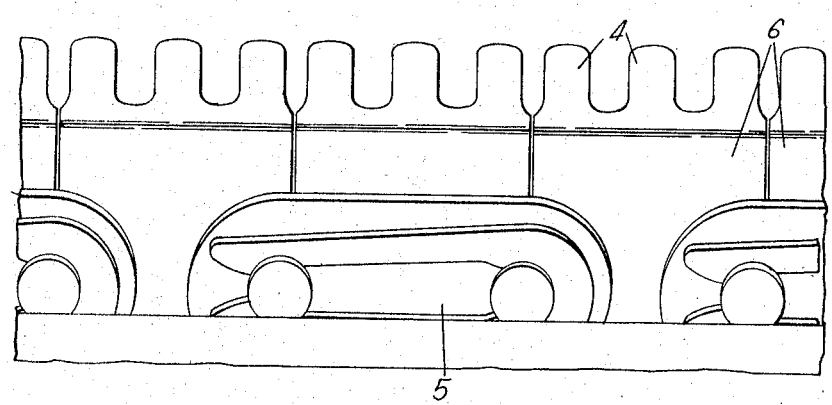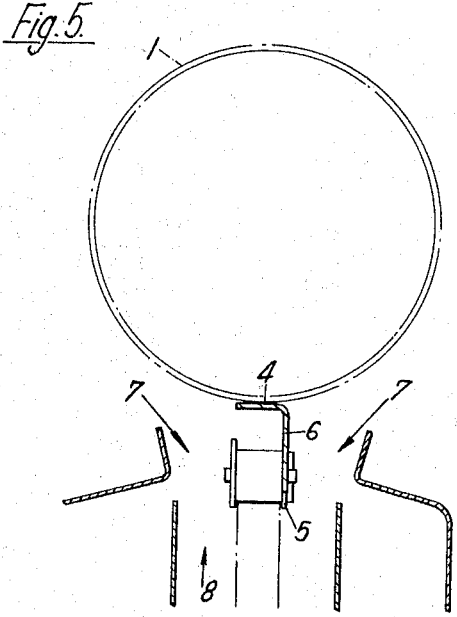

United States Patent Office 3,307,681
Patented Mar. 7, 1967

3,307,681
APPARATUS FOR PRESSING TRAVELLING CAN BODY SIDE SEAMS
Arthur Leslie Stuchbery, Enfield, Middlesex, England, assignor to The Metal Box Company Limited, London, England, a British company
Filed Nov. 30, 1964, Ser. No. 414,590
Claims priority, application Great Britain, Dec. 23, 1963, 50,779/63
9 Claims. (Cl. 198—131)

This invention relates to can body making and in particular to apparatus for conveying can bodies longitudinally away from side seam-forming devices.

When the side seam of a can body is formed by interlocked laps and tabs, filled or otherwise with solder or other bonding material, it is found that as the body is conveyed longitudinally away from the seam-forming devices there is a tendency for the laps and tabs slightly to loosen.

It is a main object of the present invention to provide means to control the laps and tabs to obtain a tighter formation of the laps and tabs.

According to the invention there is provided apparatus for conveying longitudinally away from side seam-forming devices can bodies the side seams of which are formed by interlocked laps and tabs, comprising conveyor means operable to move can bodies longitudinally in succession with the side seams in end-to-end alignment, and seam-controlling elements supported for engagement with the side seams of the can bodies and for movement in the same direction as and at the linear speed of the bodies, said elements being operable to apply a substantially even pressure to the side seams.

In a preferred embodiment of the invention the seam-controlling elements consist of resilient fingers mounted on an endless conveyor movable at the linear speed of the can bodies and carried by said endless conveyor in a manner such as to engage the side seams of the can bodies and to apply thereto a predetermined substantially even pressure.

The endless conveyor may be a chain conveyor and the fingers be formed by the horizontal limbs of inverted L-section plates the vertical limbs of which are connected to the chain. The horizontal limb of each plate may be formed to provide a plurality of fingers.

The apparatus may include ducting associated with said chain and arranged to direct cooling air on to the can bodies from each side of the chain and through the chain and fingers to set solder or other bonding material filling the laps and tabs.

In order that the invention may be clearly understood one embodiment thereof will now be described, by way of example, with reference to the accompanying drawings, in which:

FIGURE 1 is a side elevation of apparatus according to the invention;

FIGURE 2 illustrates a part of FIGURE 1 to an enlarged scale;

FIGURE 3 is a top plan of a part of the apparatus;

FIGURE 4 is a perspective view to an enlarged scale illustrating the chain of FIGURE 3 looking down at an angle from one side.

FIGURE 5 is a section on line V—V, FIGURE 2.

Referring to the drawings, can bodies 1, FIGURE 2, are conveyed longitudinally away from side seam-forming and soldering or bonding material applying devices, not shown, by conveyor means consisting of an endless chain 2 and magnetic grippers 3, shown in part in FIGURE 1. The chain 2 and the grippers 3 thereon move the can bodies longitudinally in succession with the side seams of the bodies aligned in end-to-end relation and seam-controlling elements are supported for engagement with the side seams of the can bodies and for movement in the same direction as and at the linear speed of the bodies. The seam-controlling elements are operable to apply a substantially even pressure to the side seams and as shown in the drawings consist of resilient fingers 4 mounted on an endless conveyor movable at the linear speed of the can bodies.

The last mentioned endless conveyor is a chain conveyor 5 and the fingers 4 are formed by the horizontal limbs of inverted L-section plates the vertical limbs 6 of which are connected to the chain 5. As shown in FIGURES 3 and 4 each plate is formed to provide a plurality of fingers 4.

The fingers 4 are carried by the chain 5 in a manner such that they engage the side seams of the can bodies 1 throughout a major portion of the length thereof at least intermediate the seam ends, except for seam portions opposing voids between adjacent fingers 4 (as shown in FIGURES 2 and 4) and apply thereto a predetermined substantially even pressure. Because of their resilient nature the fingers 4, when engaging with the can bodies as indicated in FIGURES 2 and 5, are yieldably spring-loaded and follow the profile of the engaged part of a can body and maintain a continuous pressure on the laps and/or tabs forming the seam without excessively straining the body. By this means there is obtained a tighter formation of the laps and tabs than has heretofore been possible.

The apparatus also includes ducting associated with the chain 5 and arranged to direct cooling air on to the can bodies from each side of the chain and through the chain and the fingers 4. By this means cooling of the bodies and setting of the solder or other bonding material is expedited while the seams are pressed tightly and controlled by the fingers 4. As shown in FIGURE 5, the ducting consists of side ducts 7 and a central duct 8, the ducts 7 directing cooling air from the sides of the chain on to the bodies and the central duct 8 directing cooling air through the chain 5 and fingers 4 on to the seams. The ducts 7, 8 are connected with a source of cooling air not shown.

The arrangement described above and employing spring fingers 4 is that which is preferred but it will be understood that seam-controlling elements other than the fingers 4 may be employed. For example the elements may consist of pads carried by the chain 5 and spring-urged towards and into engagement with the seams of the can bodies. Further, in some instances, the seam laps and tabs may not be filled with solder or other bonding material in which case the cooling means described above are not needed.

I claim:

1. Apparatus for conveying longitudinally away from side seam-forming devices can bodies the side seams of which are formed by interlocked laps and tabs, comprising conveyor means operable to move can bodies longitudinally in succession with the side seams in end-to-end alignment, and yieldable seam-controlling elements supported for engagement with the side seams of the can bodies throughout a major portion of the length thereof at least intermediate the seam ends and movable in the direction of movement of and at the linear speed of the bodies, said elements being shaped and dimensioned for being operable to apply a substantially even pressure to the side seams.

2. Apparatus according to claim 1, wherein the seam-controlling elements consist of resilient fingers mounted on an endless conveyor movable at the linear speed of the can bodies and carried by said endless conveyor in a manner such as to engage the side seams of the can bodies and to apply thereto said predetermined substantially even pressure.

3. Apparatus according to claim 2, wherein the endless conveyor is a chain conveyor and the fingers are formed by horizontally positioned limbs of inverted L-section plates the vertical limbs of which are connected to the chain.

4. Apparatus according to claim 3, wherein the horizontal limb of each said plate is formed to provide a plurality of resilient presser fingers.

5. Apparatus according to claim 4, including ducting associated with said chain and arranged to direct cooling air on to the can bodies from each side of the chain and through chain and fingers to set the solder or other bonding material filling the seams.

6. Apparatus for conveying longitudinally away from side seam-forming devices can bodies and side seams of which are formed by interlocked laps and tabs, comprising conveyor means operable to move can bodies longitudinally in succession with the side seams in end-to-end alignment, endless chain means opposing said can body moving conveyor and movable at the linear speed of said conveyor and having thereon L-section plates with vertical limbs attached to the chain and yieldable resilient horizontal limbs disposed for contacting a major portion of the seam length at least intermediate the seam ends thereof during travel of the chain for applying substantially even seam controlling pressure throughout the side seam of each can body being moved along by said conveyor means.

7. Apparatus as defined in claim 6 wherein each horizontal plate limb on the chain comprises a plurality of spaced yieldable and resilient presser fingers.

8. Apparatus as defined in claim 6 wherein there is included means for directing cooling air blasts onto the conveyed can bodies at each side of and through the chain.

9. Apparatus as defined in claim 7 wherein there is included means for directing cooling air blasts onto the conveyed can bodies at each side of the chain and through the chain and the plate fingers.

References Cited by the Examiner
UNITED STATES PATENTS

| | | | |
|---|---|---|---|
| 2,660,969 | 12/1953 | Woolford et al. | 198—41 X |
| 2,731,132 | 1/1956 | Socke | 198—41 |
| 3,056,368 | 10/1962 | Sillars | 198—162 X |

EVON C. BLUNK, *Primary Examiner.*

R. E. KRISHER, A. HODGSON, *Assistant Examiners.*